Aug. 10, 1948.　　　　H. L. GRAPP　　　　2,446,822
METHOD AND APPARATUS FOR REMOVING
VOLATILES FROM ARTICLES INVOLVING
THE USE OF INFRA-RED LAMPS
Filed Aug. 11, 1943　　　　　　　　　　　　2 Sheets-Sheet 1
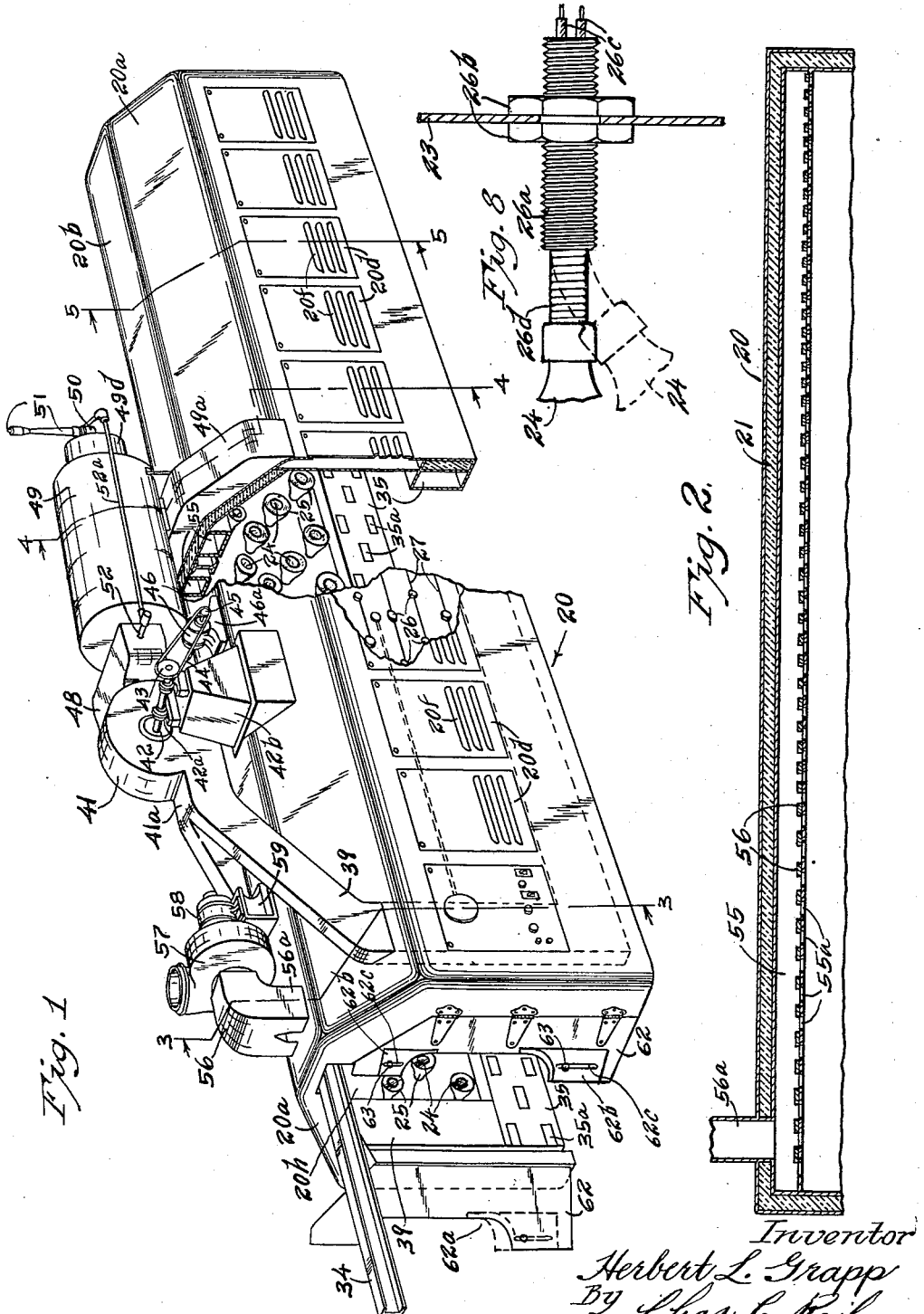
Inventor
Herbert L. Grapp
By Chas. C. Reif
Attorney Aug. 10, 1948.  H. L. GRAPP  2,446,822
METHOD AND APPARATUS FOR REMOVING
VOLATILES FROM ARTICLES INVOLVING
THE USE OF INFRA-RED LAMPS
Filed Aug. 11, 1943  2 Sheets-Sheet 2
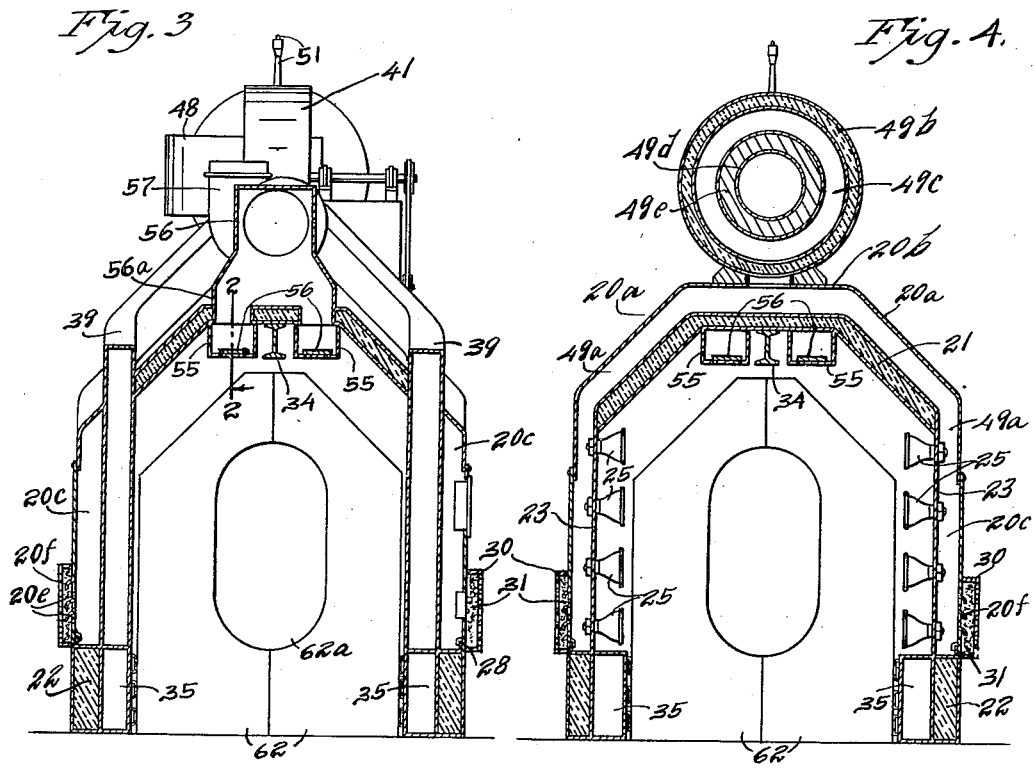
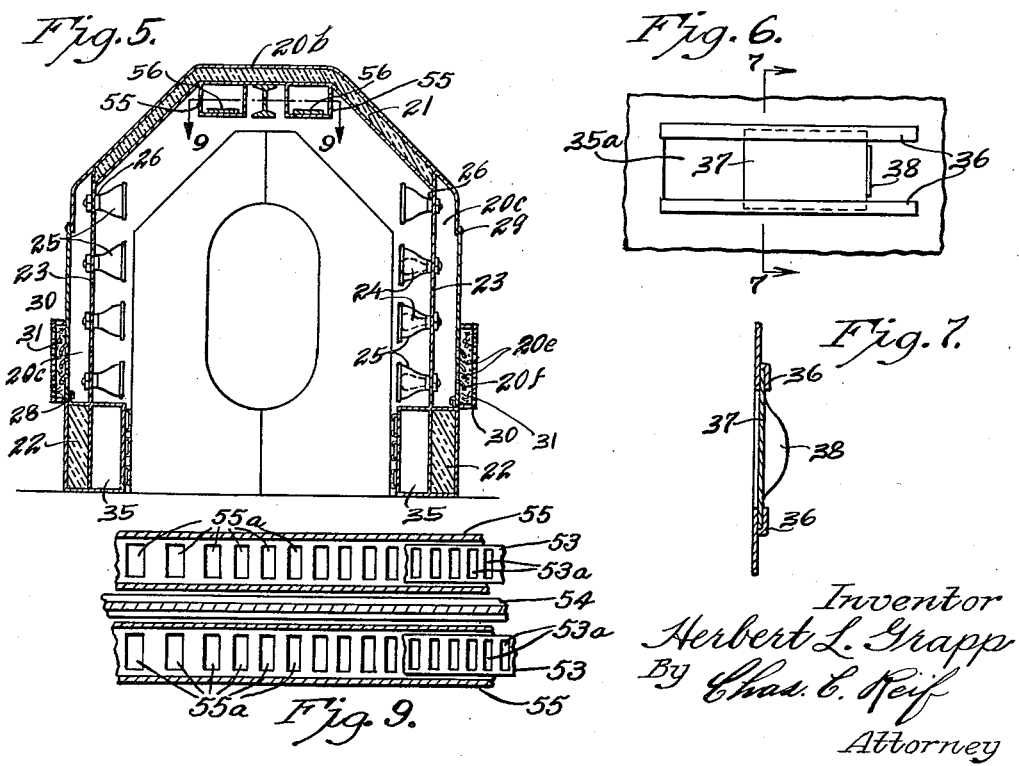
Inventor
Herbert L. Grapp
By Chas. E. Reif
Attorney Patented Aug. 10, 1948

2,446,822

UNITED STATES PATENT OFFICE 2,446,822

METHOD AND APPARATUS FOR REMOVING VOLATILES FROM ARTICLES INVOLVING THE USE OF INFRA-RED LAMPS

Herbert L. Grapp, Minneapolis, Minn.

Application August 11, 1943, Serial No. 498,225

5 Claims. (Cl. 34—17)

This invention relates to a novel method and apparatus for removing volatiles from coated or impregnated articles for the purpose of drying said articles or the coatings thereon.

A great many articles of metal and other material are now coated or painted with various substances, which substances must be dried thereon. A great many other articles including textiles, food products, synthetic resin and other plastic materials, electrical coils and armatures, certain chemical powders, cores and molds used in foundries, other water or other volatile-containing substances must have the volatiles therein driven off to properly cure said articles. Certain heat treating methods and apparatus also use infra-red rays.

In all of these drying, baking and curing operations, heat is the essential factor. The heat evaporates the volatiles causing oxidation or polymerization in some cases to effect a final dried or cured and thus finished article.

In recent periods infra-red ray lamps have been used in increasing numbers for treating, drying and curing such articles from which volatiles must be removed. These infra-red ray lamps are usually arranged in rows or banks and are usually equipped with reflectors. Certain serious objections have arisen to the use of such infrared ray lamps. Often the removed volatile matter forms a curtain of fog or mist to be disposed adjacent the material and articles being treated. This impairs the efficiency of the infra-red ray. It is desirable therefore to provide sufficient ventilation to prevent the formation of fog or mist clouds adjacent the articles being treated. Another objection is that substances from the evaporated volatiles are deposited on the lamps and reflectors when the latter are used so that they lose their efficiency.

It is an object of this invention to provide a method and apparatus whereby the above noted objections are removed and a greater efficiency of drying or removal of the volatiles is attained.

It is a further object of the invention to provide a method and apparatus for treating coated or impregnated articles from which volatiles are removed by means of infra-red rays in which a housing is placed about the infra-red ray lamps through which housing the articles are moved, in which additional heat is supplied to said articles and in which air and the evaporated volatiles are withdrawn from said housing so that objectionable effects caused by said evaporated volatiles are prevented.

It is another object of this invention to provide a novel method and apparatus used in connection with infra-red ray lamps for removing volatiles from articles in which said lamps are enclosed in a housing through which the articles to be treated are moved past said lamps and in which air is heated and delivered into said housing into contact with said articles to assist in heating and drying the same and air is withdrawn with the volatiles as certain parts of said housing so that any objectionable action of said volatiles is prevented.

It is also an object of the invention to provide an apparatus comprising a plurality of infra-red ray lamps, a housing enclosing said lamps, means for moving the articles to be treated through said housing and past said lamps, a conduit extending through said housing preferably adjacent the bottom thereof and having openings therein, means for delivering heated air through said conduit and openings into said housing for contacting the said articles to be treated, a second conduit spaced from said first mentioned conduit and preferably disposed at the top of said housing having openings therethrough together with means for withdrawing air from said housing together with the evaporated volatiles through said second mentioned conduit.

It is still further an object of the invention to provide an apparatus such as set forth in the preceding paragraph in which said air which is heated is preliminarily passed in cool condition over the sockets and wiring for said lamps before it is heated and delivered into said housing.

It is more specifically an object of this invention to provide an apparatus comprising an elongated housing, rows or banks of infra-red ray lamps and reflectors disposed along each side of said housing, means for moving the articles to be treated through said housing and between said rows of lamps, a conduit extending along each side of said housing preferably adjacent the bottom thereof and having adjustable openings therein, means for delivering air heated to a certain temperature through said conduits and openings into said housing for contacting said articles, one or more conduits extending through said housing preferably adjacent the top thereof, having openings therein and means for drawing air through said last mentioned conduits and openings together with volatiles evaporated from said articles.

These and other objects and advantages of the invention will be fully set forth in the following description made in connection with the accompanying drawings in which like reference characters refer to similar parts throughout the several views and in which:

Fig. 1 is a perspective view of one form of apparatus embodying the present invention, certain parts being omitted;

Fig. 2 is a longitudinal vertical section through a conduit at the top of the housing used, taken substantially on line 2—2 of Fig. 3 as indicated by the arrow;

Fig. 3 is a vertical section taken substantially on line 3—3 of Fig. 1 as indicated by the arrow;

Fig. 4 is a vertical section taken substantially on line 4—4 of Fig. 1 as indicated by the arrow;

Fig. 5 is a vertical section taken substantially on line 5—5 of Fig. 1 as indicated by the arrow;

Fig. 6 is a view in side elevation of an adjustable slide and portion of a conduit;

Fig. 7 is a vertical section taken on line 7—7 of Fig. 6 as indicated by the arrows, Fig. 8 is a central vertical section showing the specific mounting for a lamp; and Fig. 9 is a partial horizontal section taken on line 9—9 of Fig. 5.

Referring to the drawings an apparatus is shown comprising a housing 20. This housing is shown as of elongated form and while it could be made in various shapes, in the embodiment of the invention illustrated, it is substantially rectangular in horizontal and vertical section at its lower part and has upwardly inclined top or roof portions 20a extending to a horizontal top central portion 20b. The walls of the housing may be constructed with suitable insulation throughout all or part of their extent and in the embodiment of the invention illustrated portions 20a and 20b are shown as having spaced sides between which insulation 21 is disposed. At the lower portion of the sides the walls are also provided with insulating material 22. Said housing comprises a suitable wall or support 23 at each side thereof, having a plurality of infra-red ray lamps 24 surrounded by suitable reflectors 25. The arrangement of lamps 24 and 25 may be varied and as shown in Figs. 1, 4 and 5 they are illustrated as arranged in vertically spaced rows. Lamps 24 are disposed in suitable sockets 26 to which are connected the current conducting wires 27 as shown in Fig. 1. While the lamps 24 and reflectors 25 if the latter are used, could be variously mounted in one preferred form and in the embodiment of the invention illustrated, a threaded sleeve 26a is provided to extend through a suitable opening in wall or support 23 and is held in the desired position by lock or jam nuts 26b at each side of wall 23. Sleeve 26a is hollow and the conductors 26c connected directly to the lamps pass therethrough. These conductors also pass through a flexible member 26d which may be either a comparatively stiff flexible conduit or a bellows construction. To the end of member 26d is secured the socket proper 26 into which the lamp 24 will be screwed.

The lamps 24 and the reflectors if used can be moved inwardly and outwardly toward the center of housing 20 by adjustment of sleeve 26a. The sockets 26 and lamps carried thereby can also be varied in the direction or angle thereof by flexing the member 26d. This member can be thus flexed and moved to the desired position and will retain the lamp in such desired or adjusted position.

The sockets 26 and wiring 27 are disposed in narrow chambers 20c at each side of the housing, which chambers and thus housing 20 are provided at their outer sides with removable panels 20d. While panels 20d could be variously formed, in the embodiment of the invention illustrated, they are shown as having a thickened portion at their lower ends provided with a longitudinally extending groove or slot which fits over an upstanding rib 28. The tops of said panels 20d are held by suitable screws or other fasteners 29. Panels 20d are provided with a plurality of horizontally extended openings or louvers 20e formed by outwardly pressed portions or flanges 20f. Preferably filter casings 30 are provided having perforated walls and containing some suitable air filtering material 31, and disposed adjacent the louvers 20e. A track illustrated as an I-beam 34 is provided and extends along the top of housing 20 centrally thereof. The articles to be treated will be carried on suitable carriers or holders having wheels adapted to run on the flanges of beam 34 and thus to be moved past the lamps 24.

Extending longitudinally of housing 20 at each side thereof are conduits 35. While these conduits might be located in various positions according to the particular articles being treated in the embodiment of the invention illustrated, they are shown as disposed at the bottom of housing 20. Conduits 35 have openings 35a through their inner sides shown as spaced vertically and longitudinally, which openings will be provided with slides for regulating passage of air therethrough. While any convenient regulating means could be used in Figs. 6 and 7, one form of such means is shown comprising guide members 36 at the top and bottom sides of the openings 35a, which guide members are grooved to slidably receive the slide 37 equipped with a handle 38. A vertically extending conduit 39 is connected to each conduit 35 and these conduits 39 then extend upwardly and rearwardly to connect with the discharge portion 41a of a fan or blower 41. The blower 41 is operated by a shaft 42 having thereon a pulley 43 driven by a belt 44 running thereover and also running over a pulley 45 secured to the armature shaft of an electric motor 46 suitably mounted on a base bracket 46a located on top of housing 20, which shaft 42 is journalled in bearings 42a mounted upon a supporting structure 42b on the top of housing 20. The intake of blower 41 is connected to a casing 48 into which heated air is discharged from an air heating apparatus 49 including a burner 50 for gas or other suitable fuel. Burner 50 will be suitably supplied with fuel through suitable conduits 51. Heated air is used in the method and apparatus of the invention, which air is heated in the apparatus 49 and it is desirable to have the temperature of this air subject to regulation. For this purpose a thermostat 52 is disposed in chamber 48, the same being shown as projecting therefrom and connected by a suitable wiring conduit 52a to a fuel regulator connected to burner 50. The air heating apparatus 49 specifically forms no part of the invention and such air heating devices are now well known in the art. As shown in Fig. 4 said heater has an insulating wall 49b extending about an air heating chamber 49c. The products of combustion are delivered at one end through a member or conduit 49d surrounded by fire brick or similar material 49e. Thermostatic control of the temperature of the air by suitably regulating the burner also specifically and per se forms no part of the present invention. The intake of the air for heating device 49 comprises conduit 49a and this conduit is connected to the tops of the chambers 20c. The air will be drawn by blower 41 through the filter material 31 through the louvers 20e into the chambers 20c and from thence into the air heater 49.

The air and volatiles evaporated in the housing 20 are removed and while the point of removal may be varied to suit conditions, in the embodiment of the invention illustrated, conduits 55 are disposed at the top of housing 20 respectively at each side of the beam 34. These conduits have a multiplicity of openings 55a in their lower side opening into the housing and these openings will be controlled by movable slides 53 of any suitable construction and having openings 53a therein which can be brought into and out of alignment with openings 55a. As shown in Fig. 2 the openings 55a are larger at the entrance end of the housing and progressively diminish in size toward the other end of the housing. Conduits 55 are connected to the legs 56a respectively of a conduit 56 connected to the intake side of an exhaust fan 57 disposed above the housing 20 and supported thereon. Fan 57 is driven by an electric motor 58 mounted on a base 59 supported upon the top of housing 20. The housing 20 has openings at front and rear and these are preferably closed by swinging doors 62. Doors 62 have opening 62a and adjustable slides 62b are provided, having slot 62c through which extends securing bolts 63. Slides 62b can be moved to more or less cover openings 62a. Door 62 may also be equipped with flaps or other devices past which the articles or carriers would move.

In the operation of the apparatus, and in carrying out the novel method of the invention, the articles to be dried or baked and from which volatiles are to be evaporated, will be as stated supported on suitable carriers moving on the lower flanges of beam 34. They will be moved into housing 20 and moved past the lamps 24 at a speed suitable for the particular article. Blower 41 will be driven from motor 46 through the belt 44 and cool air from the atmosphere or other source will be drawn through the filtering material 31 through the louvers 20e into chambers 20c along the sides of housing 20. This cool air will move over the sockets 26, wiring 27 and any other fastening devices or appurtenances of the lamps 24 and their reflectors. This air will cool said sockets, wiring or wiring and appurtenances and will be drawn from chambers 20c through conduits 49a into the air intake opening of the air heating device 49. The air will be heated in heater 49 by operation of burner 50 and this heated air will be drawn into casing 48 and into the blower 41. Said air will be discharged from said blower through its discharge portion 41a and will pass through conduits 39 into the conduits 35. From conduits 35 the heated air, which may be termed "make-up" air, will be discharged into housing 20 and into contact with the articles being treated in said housing. The amount of air discharge can be nicely regulated by the slides 37 controlling the size of openings 35a. It has been found by experimentation that the greater portion of the heat or heated air must be put into the housing near the entrance end thereof, as by so doing a very useful gain in the time factor is obtained by assisting the lamps to bring the work up to the desired temperature. The articles to be treated give off the most dangerous and in some cases most explosive volatiles during the first one-third of the distance traveled through the housing. It is of great importance to have proper ventilation or removal of the air and volatiles. In some cases the volatiles are rather poisonous or very detrimental to the health of the employees and in other cases they are explosive when mixed with the air. As above indicated the volatiles often tend to form a cloud or mist of fog about the articles which reduces the efficiency of the drying process. Furthermore if the volatiles are not removed they often tend to settle on the reflectors of the lamps and to so coat the reflectors that their efficiency is greatly reduced. These reflectors are made with either a high highly reflective paint, are chromium plated or are in some cases plated with gold or expensive metal. It is important therefore to have conditions which do not adversely affect the reflector. To effect the proper ventilation and properly remove the volatiles, the exhaust conduits 55 are provided. The exhaust fan 57 will be operated by motor 58 and air will be drawn through conduits 55 as will, also the volatiles produced by the lamps and heated air. Most of the volatiles must be removed adjacent the front or entrance end of the housing and for this purpose the openings 55a are made of larger area adjacent said end. The openings 55a adjacent the entrance end of the housing will have much fuller openings in the adjustment of slides 53 than the openings adjacent the other end. The heated "make-up" air and the volatiles are thus constantly withdrawn from housing 20 and the larger part of the volatiles are withdrawn adjacent the entrance end of the housing. In most of the infra-red ray lamp installations, the lamps and work have not been enclosed. This produces unhealthy conditions in the room in which the operation is taking place. By providing the housing 20 the air and volatiles are confined and are properly disposed, distributed and removed. The atmosphere in the work room is thus kept free from any of the volatiles. If merely ventilation of air is provided about the work and lamps, this has a tendency to cool both the work and the lamps and thus lower the efficiency of the drying operation. By supplying heated air and confining the air and volatiles, said noted objection is eliminated and the efficiency of the drying process is increased. The infra-red ray has very little or no capacity to heat the air through which it travels. The drying when done only by the infra-red ray lamps therefore takes place in a comparatively low temperature medium. By supplying the heated "make-up" air this defect is removed and the efficiency of the drying process is greatly increased. The temperature of the heated air delivered into the housing can be automatically regulated. The heat from infra-red ray lamps is not so automatically regulated and a very desirable factor is thus introduced by the supply of the heated "make-up" air. The supply of the heated air is nicely regulated throughout the length of the housing and the air is withdrawn in the proper quantity and at the proper location. The articles are thus efficiently treated and pass out at the delivery end of the housing in completed condition and properly cured, dried or baked. Preferably the inner surfaces 20h of the walls of housing 20 are made up of highly reflective material. This assists in the reflection of the infra-red rays onto the work and further increases the efficiency of said rays and lamps.

From the above description it will be seen that I have invented a very efficient method and apparatus for removing volatiles from articles to cure, dry or bake the same. By enclosing the articles treated and the infra-red ray lamps the air in the room surrounding the dryer installation will be kept at a moderate or desired temperature and will be kept free from the volatiles. This safeguards the health of the workers inasmuch as they will not have to breathe any of the volatiles. In many cases the fumes or vapors formed by the article are quite toxic in effect and have an injurious action on the eyes and lungs of the employees. By filtering the air delivered to the housing the articles treated will be kept free from dirt or dust particles. By supplying the heated "make-up" air and by providing the proper ventilation and removal of the volatiles, the speed of the curing, baking or drying operation can be increased as much as 40%. The cost of the operation per ton of material or per piece to be dried will be definitely reduced as the cost of the heated air is much less than the cost of the electric power used with the lamps. For a given amount of material to be treated a lesser number of lamps may be used than where the housing and heated "make-up" air and ventilation are not provided. Since the objectionable results of the volatiles on the lamps and reflectors are eliminated a lesser number of lamps can be used for this reason. The method and apparatus have been amply demonstrated in actual practice and found to be very successful and efficient.

It will of course, be understood that various changes may be made in the form, details, arrangement and proportions of the apparatus and in the steps and sequence of steps of the method without departing from the scope of applicant's invention, which generally stated, consists in a method and apparatus capable of carrying out the objects above set forth, such as disclosed and defined in the appended claims.

What is claimed is:

1. An apparatus for treating articles from which volatiles are to be evaporated having in combination, a housing, a row of infra-red ray lamps at one side of said housing, chambers at the side of said housing, wiring and sockets for said lamps disposed in said chambers, means for drawing cool air through said chambers, means for subsequently heating said air, means for delivering said heated air into said housing below said lamps and into contact with said articles and means for withdrawing said air and volatiles from said housing at a location above said lamps and discharging said air and volatiles into the atmosphere.

2. The method of treating coated or impregnated articles for removing volatiles therefrom which consists in moving said articles past a plurality of infra-red ray lamps disposed in a closed housing and carried in sockets and having suitable wiring without said housing, filtering cool air, drawing said cool air over said wiring and sockets, subsequently heating said air, delivering said heated air into said housing and into contact with said articles and confining said air about said articles and lamps to assist in heating said articles and quickly bringing the same to the desired temperature and then withdrawing said air and evaporated volatiles from said articles and lamps and discharging the same into the atmosphere.

3. The method of removing volatiles from articles and drying said articles, which consists in moving said articles through an elongated housing, directing the rays from infra-red lamps against said articles throughout the length of said housing, supplying heated air to said housing at the front end portion thereof to assist said lamps in quickly raising the temperature of said articles to the desired point, withdrawing the larger portion of said air and volatiles from said articles adjacent the front of said housing, supplying heated air in diminished volume throughout the remainder of said housing, and withdrawing air in diminished volume throughout the remainder of said housing.

4. The method of removing volatiles from articles and drying said articles, which consists in progressing articles through an elongated housing, directing infra-red rays against said articles adjacent the entrance end of said housing, supplying heated air to said housing adjacent the entrance end thereof, withdrawing air and volatiles adjacent the entrance end of said housing, continuing to direct infra-red rays against said articles throughout the length of said housing, supplying heated air in diminished amount throughout the remainder of the length of said housing, and withdrawing air and volatiles in diminished amount throughout the remainder of the length of said housing.

5. An apparatus for treating articles from which volatiles are to be evaporated having in combination, an elongated housing having top, bottom and side walls, means on which articles to be treated are supported and moved progressively through said housing, banks of infra-red lamps at each side of said housing throughout the length thereof, means for directing rays from said lamps upon said articles as they are moved through said housing, air delivery conduits extending along each side of said housing adjacent but above the bottom wall thereof, said conduits having openings therethrough spaced longitudinally throughout the length thereof, means for heating air, means for forcing said air so heated through said conduits and openings into said housing to assist said lamps in raising the temperature of said articles, a conduit extending through said housing adjacent the top thereof having openings therein spaced longitudinally thereof throughout the length of said housing, means for drawing air from said last mentioned conduit and discharging the same to the atmosphere whereby said articles are quickly heated by said rays and heated air and said air and the volatiles from said articles are drawn off and discharged into the atmosphere, said lamps being disposed in sockets disposed partly without said side walls, chambers in which said sockets are exposed, wiring for said sockets in said chambers, and means for passing said air through said chambers and then to said heating means to be heated.

HERBERT L. GRAPP.

REFERENCES CITED

The following references are of record in the file of this patent:

UNITED STATES PATENTS

| Number | Name | Date |
|---|---|---|
| 1,044,343 | Rudd | Nov. 12, 1912 |
| 1,225,212 | Benjamin | May 8, 1917 |
| 1,254,650 | Bollinger | Jan. 29, 1918 |
| 1,339,092 | Benjamin | May 4, 1920 |
| 1,420,679 | Beckworth et al. | June 27, 1922 |
| 1,463,923 | Nelson | Aug. 7, 1923 |
| 1,737,259 | Miller | Nov. 26, 1929 |

(Other references on following page)

UNITED STATES PATENTS

| Number | Name | Date |
|---|---|---|
| 1,888,573 | Sadwith | Nov. 22, 1932 |
| 2,113,770 | Richardson | Apr. 12, 1938 |
| 2,140,337 | Somes | Dec. 13, 1938 |
| 2,236,397 | Drummond | Mar. 25, 1941 |
| 2,251,617 | Pirnie | Aug. 5, 1941 |
| 2,336,110 | Matteson et al. | Dec. 7, 1943 |
| 2,349,300 | Olsen | May 23, 1944 |
| 2,355,671 | Naeher et al. | Aug. 15, 1944 |
| 2,355,814 | Mayer | Aug. 15, 1944 |
| 2,360,257 | Muller et al. | Oct. 10, 1944 |

OTHER REFERENCES

"Radiant Heat and Its Application," by James D. Hall, pages 213 to 217 of Technical Association Papers, 25th Series, 1942.

"Infra-Red Radiation," pages 229 and 230 of the magazine The Chemical Age, March 4, 1944, vol. L, No. 1288.

"Infra-Red Does the Trick," article by A. P. Peck, published in Scientific American, Sept. 1941, pages 124–127.